(12) United States Patent
Mita et al.

(10) Patent No.: US 6,573,730 B2
(45) Date of Patent: Jun. 3, 2003

(54) DETECTOR PROVIDED WITH PLURAL INPUT MEANS FOR OBTAINING OUTPUT BY CHANGES IN RESISTANCE VALUES

(75) Inventors: Koji Mita, Fukushima-ken (JP); Isao Sato, Fukushima-ken (JP); Youtaro Sakakura, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/910,995

(22) Filed: Jul. 23, 2001

(65) Prior Publication Data

US 2002/0030498 A1 Mar. 14, 2002

(30) Foreign Application Priority Data

Jul. 27, 2000 (JP) ........................ 2000-226398

(51) Int. Cl.[7] .................... G01R 27/02; G01R 27/08
(52) U.S. Cl. .................... 324/609; 324/713
(58) Field of Search .............. 324/713, 609, 324/602

(56) References Cited

U.S. PATENT DOCUMENTS 4,441,097 A * 4/1984 Anderson ............ 178/18.03
5,008,497 A * 4/1991 Asher ................. 178/18.05
5,305,644 A * 4/1994 Ehrreich ................. 338/5
5,583,303 A * 12/1996 Franz ................ 73/862.046
6,067,863 A * 5/2000 Favre et al. ............. 341/34

FOREIGN PATENT DOCUMENTS

JP 2000-353604 12/2000

* cited by examiner

*Primary Examiner*—N. Le
*Assistant Examiner*—John Teresinski
(74) *Attorney, Agent, or Firm*—Brinks Hofer Gilson & Lione

(57) ABSTRACT

A detector with plural variable resistors, each having a resistance member and an elastically deformable element connected to common fixed resistors, and midpoints between the variable resistors and the fixed resistors connected to an A/D converting circuit as common output paths. Connection parts connected to the variable resistors are switched in order to a ground potential, whereby voltage outputs based on changes in resistance values of the variable resistors can be obtained in order from the common output paths.

2 Claims, 4 Drawing Sheets

DETECTOR PROVIDED WITH PLURAL INPUT MEANS FOR OBTAINING OUTPUT BY CHANGES IN RESISTANCE VALUES

BACKGROUND OF THE INVENTION

1. Field of the Invention

The present invention relates to a detector provided with plural input means for obtaining output by changes in resistance values, and more particularly to a detector that switches outputs from the plural input means with a simple circuit construction.

2. Description of the Prior Art

Some recent game controllers have, in addition to ON-OFF switches, switches that provide outputs changing in an analog fashion according to changes in push pressure. By using this type of controller in, for example, a car race game, game operations such as car speed adjustment can be performed with adjustment of the pushing force onto a pushbutton.

Input means capable of changing output by changing the push pressure are, for example, those that are provided with resistance members on a substrate thereof and have elastically deformable contacts facing the resistance members, wherein the contacts are made of a material having a lower resistivity than the resistance members. Pushing a pushbutton to press the contact against the resistance member causes resistance values to change corresponding to changes in a contact area between the contact and the resistance member.

The input means generally reduce influence of output fluctuations due to changes in environment temperature, and resistance value variations at manufacturing time by connecting an element for changing resistance values and a fixed resistor in series using the contact and delivering a potential at a midpoint between them as an output value.

FIGS. 6 and 7 show circuit configurations for a conventional detector provided with plural input means.

Input means 1a, 1b, 1c, . . . , and 1n have variable resistors VR1, VR2, VR3, . . . , and VRn individually connected in series with fixed resistors R1, R2, R3, and Rn, wherein the variable resistors VR1, VR2, VR3, and VRn each comprise the resistance member and the contact. A common source voltage Vcc is applied to the ends of the fixed resistors R1, R2, R3, . . . , and Rn of the input means 1a, 1b, 1c, . . . , and 1n, and the ends of the variable resistors VR1, VR2, VR3, . . . , and VRn are grounded together. Each input means has an output part P1, P2, P3, . . . , or Pn at a midpoint between the variable resistor and the fixed resistor, and an output from the output part is converted into a digital value by an A/D converter 2 before being presented to the CPU.

In the detector shown in FIG. 7, signals obtained from the output parts P1, P2, P3, . . . , and Pn at the midpoints are switched in order by a switching means 3 comprised of active elements before being presented to the A/D converter and the CPU.

As shown in FIG. 6, in the detector in which all the output parts P1, P2, P3, . . . , and Pn of the input means 1a, 1b, 1c, 1d, . . . , and In are converted by the A/D converter 2 before being presented to the CPU, each of the output parts P1, P2, P3, and Pn must be subjected to A/D conversion in parallel. Accordingly, the A/D converter 2 must be expansive so that plural input signals can be subjected to A/D conversion in parallel, and the CPU is also heavily loaded for data processing because plural outputs having been subjected to A/D conversion are inputted at the same time.

In the detector shown in FIG. 7, since outputs from the output parts P1, P2, P3, . . . , and Pn are switched in order by the switching means 3 comprised of active elements before being presented to the A/D converter and the CPU, an A/D converter supporting one-line outputs can be used, with the result that the circuit can be configured at a low cost, and since one-line outputs are switched and inputted to the CPU, loads on the CPU can be reduced.

However, in the detectors shown in FIGS. 6 and 7, in all of the input means 1a, 1b, 1c, . . . , and 1n, since a source voltage is applied at all times and other ends are grounded, currents keep flowing through all the input means, consuming a large amount of current.

In the detector shown in FIG. 7, since the number of channels switched by the switching means 3 must be the same as the number of the input means 1, 1b, 1c, . . . , and 1n, a switching element with a complicated structure must be used as the switching means 3. Also, the switching means 3 must switch a large number of channels and the switching of the switching means 3 is performed in multiple stages, with the result that the CPU is more heavily loaded to control the switching.

SUMMARY OF THE INVENTION

The present invention has been made to solve the above-described problems and provides a detector that, when the plural input means are provided, can reduce current consumption and lessen control loads by decreasing the number of switched channels.

A detector of the present invention is provided with plural input means each of which has an element changing in resistance value and a fixed resistor connected in series with each other, a midpoint between the element and the fixed resistor being defined as an output part, wherein one of the plural input means is held at a predetermined potential, a switching means is provided for switching in order other ends of the input means to a low potential, and an output from the output part of the input means switched to the low potential by the switching means is detected.

According to the present invention, since plural input means are placed in order into a low potential and outputs from input means placed into the low potential are detected in order, no undesired current flows through input means detecting no output, contributing to saving power consumption.

There is provided a common output path connected in common to the output parts of the plural input means, and it is desirable that an output from an input means switched to a low potential in the other end thereof is detected through the common output path.

Providing output path commons to plural input means reduces the number of output lines provided to an A/D converter and the like, and enables use of an A/D converter with fewer lines. If the common output paths are switched to provide an output to the CPU, since the number of common output paths is reduced, the number of channels to be switched can be reduced.

In the plural input means provided with the common output paths, preferably, a fixed resistor common to the individual elements of the input means is connected in series, the end of the fixed resistor is held at the predetermined potential, and the respective ends of the elements are switched to the low potential by the switching means.

By using fixed resistors common to plural elements as described above, the number of parts can be reduced.

For example, the present invention may be configured as follows: outputs from the input means are detected; a control part constituting the switching means is provided; and the control part switches in order the other ends of the input means to the low potential and switches the other ends thereof not placed into the low potential to high impedance.

In this way, switching to a low potential and output detection are carried out by a common control part (CPU) whereby a circuit configuration can be simplified. The switching means for switching to the low potential and the output detecting means may be formed in separate systems.

The elements changing in resistance value have a resistance member and a contact that has a lower resistivity than the resistance member and contacts the resistance member while deforming elastically, and resistance values of the resistance member change according to changes in a contact area between the resistance member and the contact.

The elements may have other configuration if they are those that can change in resistance value.

BRIEF DESCRIPTION OF THE DRAWINGS

Preferred embodiments of the present invention will be described in detail based on the followings, wherein.

DESCRIPTION OF THE PREFERRED EMBODIMENTS

Figure 1:
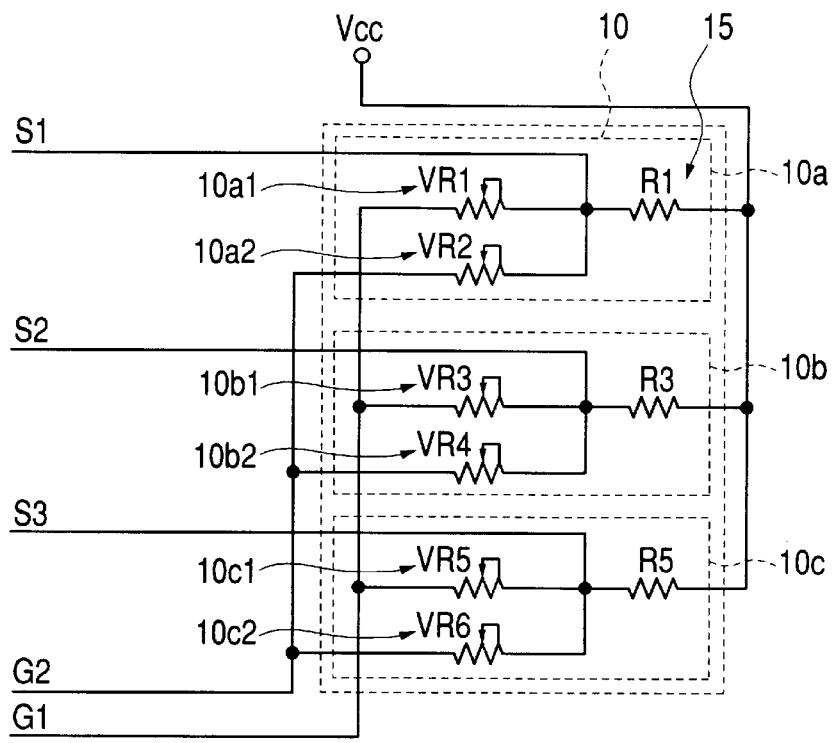
FIG. 1 is a schematic circuit diagram showing a first embodiment of a detector of the present invention.
Figure 2:
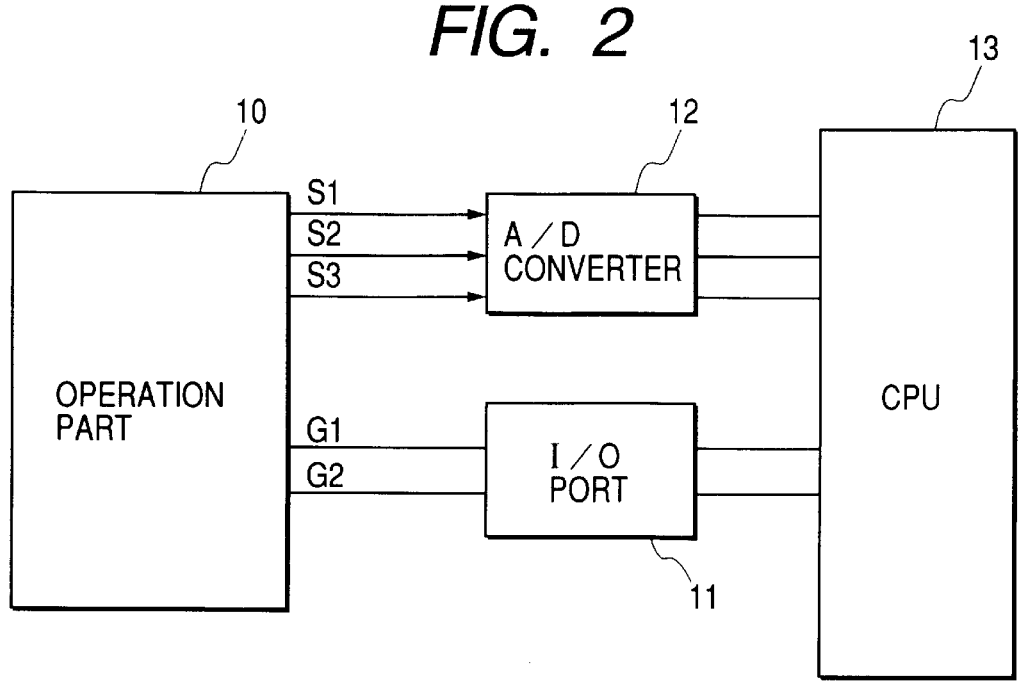
FIG. 2 is a circuit block diagram of the first embodiment.

FIG. 1 is a schematic circuit diagram showing a first embodiment of a detector of the present invention; FIG. 2 is a circuit block diagram of the first embodiment; and FIG. 3 is a perspective view showing the structure of input means.

In this detector, an operation part 10 shown in FIG. 1 is provided with three input parts, 10a, 10b, and 10c. The input parts 10a, 10b, and 10c each are provided with two input means.

Figure 3:
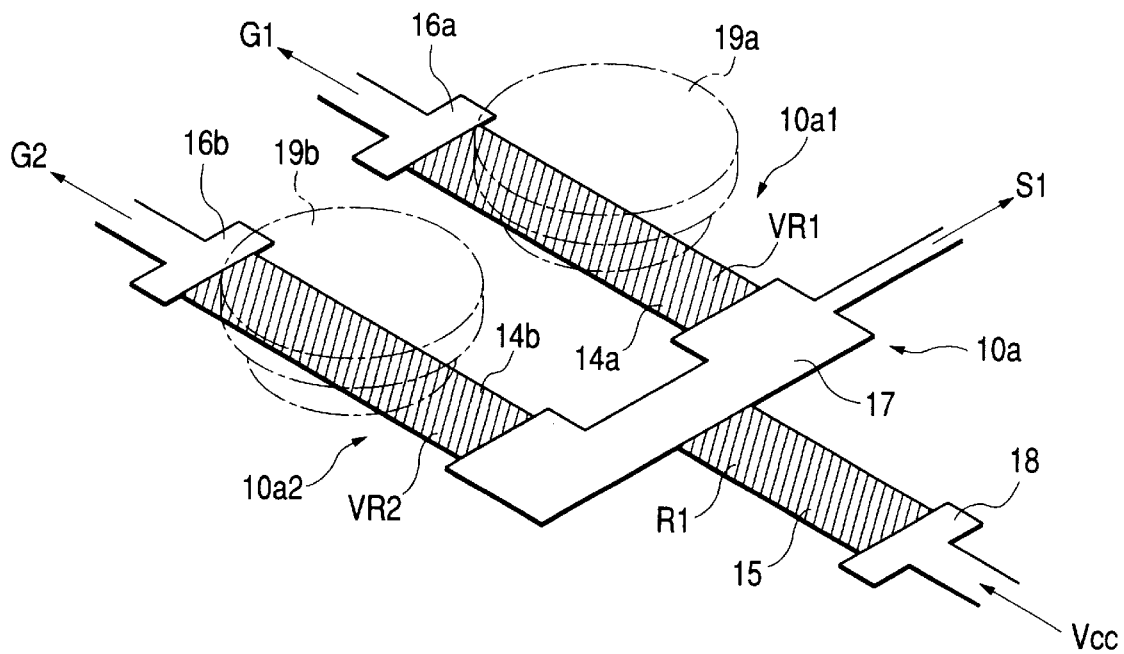
FIG. 3 is a perspective view showing the structure of an input means of the first embodiment.

FIG. 3 shows the structure of the input part 10a, which is one of the three input parts 10a, 10b, and 10c. The input part 10a is provided with elements 10a1 and 10a2 constituting two input means. One element 10a1 is provided with a resistance member 14a formed on a substrate, and a contact 19a facing the resistance member 14a, while the other element 10a2 is also provided with a resistance member 14b, and a contact 19a facing the resistance member 14b. The resistance members 14a and 14b are carbon films and the contacts 19a and 19b are made of rubber, an elastically deformable material, into which carbon black is mixed. The contacts 19a and 19b are set to a lower resistivity than the resistance members 14a and 14b.

In the input part 10a, the contacts 19a and 19b are secured to a pushbutton, and when the pushbutton is pushed, the contact 19a or 19b is brought into contact with the resistance member 14a or 14b. When the pushbutton is further pushed with a changed push pressure, a contact area between the contact 19a and the resistance member 14a changes, thereby changing the resistance value of the element 10a1. The same is also true for the element 10a2 comprising the contact 19b and the resistance member 14b.

In the input part 10a, a common fixed resistor 15 is connected in series with the elements 10a1 and 10a2. This means that there are provided two input means, one comprising the element 10a1 and the fixed resistor 15 and the other comprising the element 10a2 and the fixed resistor 15. In FIG. 1, the elements 10a1 and 10a2 are designated by variable resistors VR1 and VR2, and the fixed resistor 15 is designated by R1.

As shown in FIG. 1, the fixed resistor 15 is connected to a source voltage Vcc via a conductive pattern 18. The resistance member 14a of the element 10a1 is guided to a selection line G1 for switching to a low potential (e.g., ground potential) via a conductive pattern 16a, and the resistance member 14b of the element 10a2 is guided to a selection line G2 for switching to a low potential via a conductive pattern 16b.

A midpoint pattern 17 between the resistance members 14a and 14b of the elements 10a1 and 10a2 and the fixed resistor 15 serves as an output part, and the midpoint pattern 17 forms an output path S1 common to the elements 10a1 and 10a2.

In the input part 10a, when the selection line G1 goes into a low potential (ground potential) and the selection line G2 goes into high impedance, a voltage output corresponding to a change in the variable resistor VR1 of the element 10a1 can be obtained from the common output path S1. The voltage output at this time is $Vcc \times \{VR1/(VR1+R1)\}$. Conversely, if the selection line G2 goes into a low potential (ground potential) and the selection line G1 goes into high impedance, a voltage output corresponding to a change in the variable resistor VR2 of the element 10a2 can be obtained from the common output path S1. The voltage output at this time is $Vcc \times \{VR2/(VR2+R1)\}$.

Other input parts 10b and 10c shown in FIG. 1 also have the same structure. The elements 10a1, 10b1, and 10c1 are connected to the common selection line G1, and the elements 10a2, 10b2, and 10c2 are connected to the common selection line G2. The ends of the fixed resistors R1, R2, and R3 are set to the common source voltage Vcc. The common output paths S1, S2, and S3 extend from the input parts 10a, 10b, and 10c, respectively.

As shown in FIG. 2, the selection lines G1 and G2 are respectively connected to an I/O port 11, which is connected to a CPU 13. The common output paths S1, S2, and S3 are inputted to an A/D converter 12 for conversion into digital signals. The digital signals are inputted to the CPU 13. In this embodiment, the CPU 13 functions as a switching means that switches in order the selection lines G1 and G2 to a low potential, in conjunction with the I/O port 11, and further the CPU 13 functions as a detecting part that detects outputs from the common output paths S1, S2, and S3.

The I/O port 11 has a tri-state system in which the selection lines G1 and G2 can be set to a high level (hereinafter referred to as H) state, a low level (hereinafter referred to as L) state, and a high impedance state (hereinafter referred to as Hi-z), which is an open state.

Next, the operation of the detector will be described.

As shown in Table 1, the I/O port 11 is controlled by the CPU 13 functioning as a switching means so that the selection lines G1 and G2 are switched in a timesharing mode to a low potential (Low: e.g., ground potential) and high impedance (Hi-z), respectively, and then the selection lines G1 and G2 are switched to high impedance and a low potential, respectively.

When the selection line G1 is at a low potential and the selection line G2 is at high impedance, a current flows through one element 10a1, 10b1, and 10c1 of each of the input parts 10a, 10b, and 10c, and the fixed resistors R1, R2, and R3. However, no current flows through other elements 10a2, 10b2, and 10c2.

Consequently, a voltage output determined by a voltage dividing ratio between the variable resistor VR1 and the fixed resistor R1 of the element 10a1 is obtained from the common output path S1, and in the same way, from the common output paths S2 and S3, voltage outputs determined by voltage dividing ratios between the elements 10b1 or 10c1, and the fixed resistors are respectively obtained.

Next, when the selection line G1 is switched to high impedance and the selection line G2 is switched to a low potential, from the common output paths S1, S2, and S3, voltage outputs determined by voltage dividing ratios between the elements 10a2, 10b2, or 10c2, and the fixed voltages R1, R2, or R3 are respectively obtained.

TABLE 1

| I/O PORT | | OUTPUT DATA | | |
|---|---|---|---|---|
| G1 | G2 | COMMON OUTPUT PATH S1 | COMMON OUTPUT PATH S2 | COMMON OUTPUT PATH S3 |
| Low | Hi-z | 10a1 | 10b1 | 10c1 |
| Hi-z | Low | 10a2 | 10b2 | 10c2 |

More specifically, by alternately switching the two selection lines G1 and G2 to a low potential in a timesharing mode, outputs from two input means are alternately presented to each of the three common output paths S1, S2, and S3, and an output from the three elements 10a1, 10b1, and 10c1, and an output from the three elements 10a2, 10b2, and 10c2 are alternately presented to the CPU 13.

As shown in FIG. 2, voltage outputs obtained from the common output paths S1, S2, and S3 are converted into digital values by the A/D converter 12, and the digital values are presented to the CPU 13, and are detected and processed by the CPU 13. That is, the CPU 13 can supervise all of the six elements 10a1, 10a2, 10b1, 10b2, 10c1, and 10c2, and can recognize how strongly the contact of a particular element is pushed in.

In FIG. 2, since three output paths are provided to detect the status of a total of six elements, the A/D converter 12 is sufficiently available if it is capable of conversion processing for the three output paths, so that an inexpensive A/D converter 12 can be used. Since input to the CPU 13 is also made through only three lines, the number of input ports used in the CPU 13 can be saved, relieving the CPU 13 from loads.

In the embodiment shown in FIG. 2, for example, at the respective times when the selection line G1 is placed into a low potential or the selection line G2 is placed into a low potential, the three common output paths S1, S2, and S3 may be switched in a timesharing mode to provide outputs to the CPU 13. More specifically, by switching the switching means so as to place the selection line G1 into a low potential, outputs from the elements 10a1, 10b1, and 10c1 are presented in order to the CPU 13, and by switching the switching means so as to place the selection line G2 into a low potential, outputs from the elements 10a2, 10b2, and 10c2 are presented in order to the CPU 13. In this case, a means for switching three channels may be placed between the A/D convert 12 and the common output paths S1, S2, and S3.

In the above-described detector, when one of the selection lines G1 and G2 is placed into a low potential, since the other is placed into high impedance, a current flows alternately through three of the elements 10a1, 10a2, and so forth each comprising a contact and a resistance member. Accordingly, no current flows through elements not detected, contributing to reducing current consumption.

Figure 4:
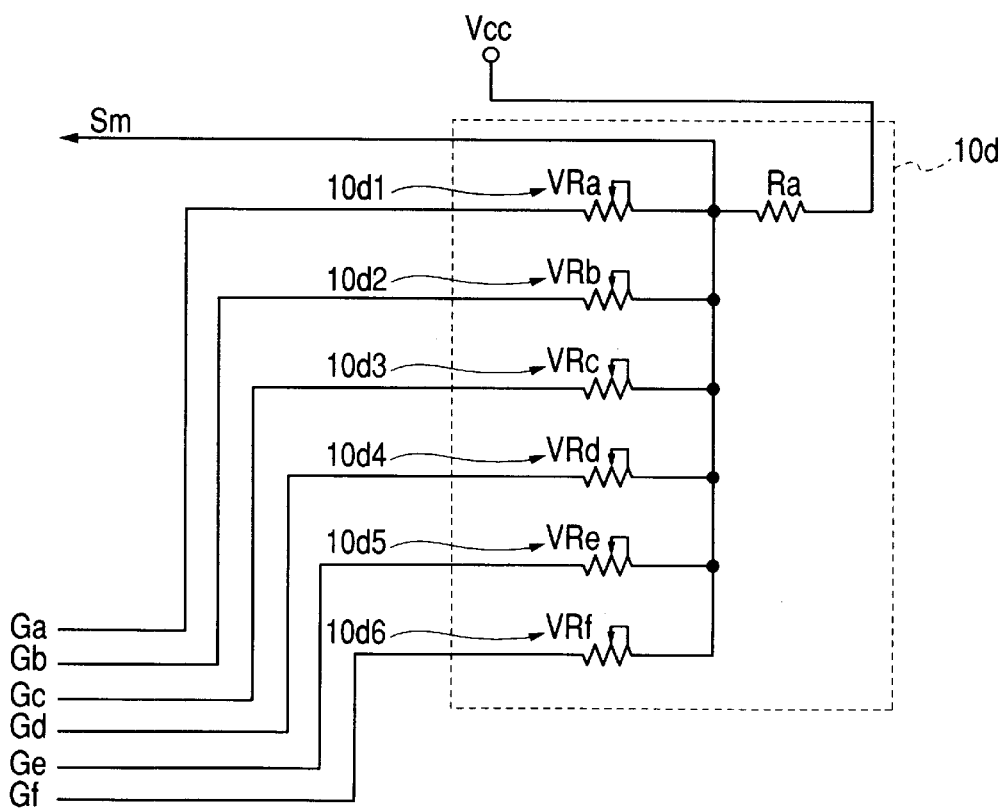
FIG. 4 is a schematic circuit diagram showing a second embodiment of the detector of the present invention.
Figure 5:
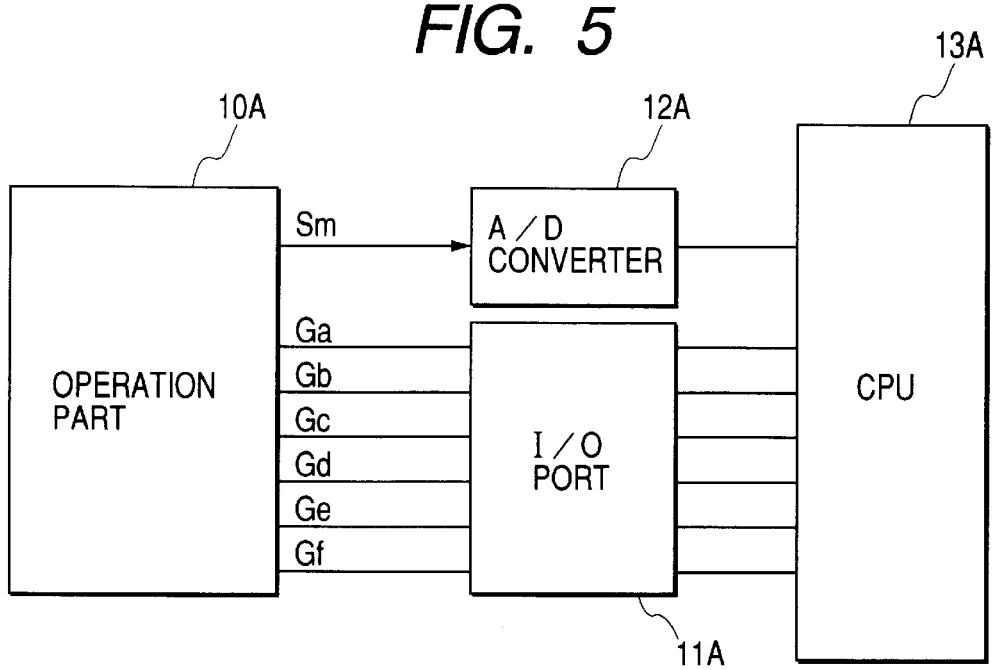
FIG. 5 is a circuit block diagram of the second embodiment.

FIG. 4 is a schematic circuit diagram showing a second embodiment of the detector of the present invention, and FIG. 5 is a block diagram of the circuit.

In the detector shown in FIG. 4, the input part 10 d is provided with plural elements 10d1, 10d2, . . . , and 10d6. The elements are structurally identical with the elements 10a1 and 10a2 shown in FIG. 3, and comprise a resistance member having a high resistance and an elastically deformable contact having a lower resistivity than the resistance member. In FIG. 4, variable resistors of the elements are designated by VRa, VRb, VRc, . . . , and VRf.

In the input part 10d, a common fixed resistor Ra is connected in series with the elements 10d1, 10d2, . . . and 10d6. Therefore, there are provided six input means, such as an input means with the element 10d1 and the fixed resistor Ra connected in series, an input means with the element 10d2 and the fixed resistor Ra connected in series, an input means with the element 10d3 and the fixed resistor Ra connected in series, and so forth.

One end of the fixed resistor Ra is set to the source voltage Vcc. The ends of the elements 10d1, 10d2, and 10d6 are respectively connected to selection lines Ga, Gb, Gc, . . . , and Gf to a low potential. Output parts at midpoints between the elements 10d1, 10d2, . . . , and 10d6, and the fixed contact Ra are connected to a common output path Sm.

As shown in FIG. 5, the selection lines Ga, Gb, Gc, . . . , and Gf are connected to an operation part 10A and an I/O port 11A, and the common output path Sm is inputted to the A/D converter 12A.

In this embodiment, the CPU 13A performs switching control so that, in the I/O port 11A, the selection lines Ga, Gb, Gc, . . . , and Gf are switched in order to a low potential (e.g., ground potential), when other selection lines go into high impedance. When the selection line Ga goes into a low potential, a current flows through the fixed resistor Ra and the element 10d1, and no current flows through other elements. A voltage output of Vcc×{VRa/(VRa+Ra)} is obtained from the common output path Sm. This is switched in order in a timesharing mode in the elements 10d1, 10d2, . . . , and 10d6, and its output is presented to the A/D converter 12A through one line and is converted to a digital value before being processed in the CPU 13A.

In this embodiment, since a current flows through only one element in order and no current flows through any other element, current consumption can be reduced even when there are three elements. Also, since only one line is available as the common output path Sm, the A/D converter 12A can employ a converting circuit for one line and only one line is used as an input port of the CPU 13A, with the result that the CPU 13A is not so heavily loaded.

Figure 6:
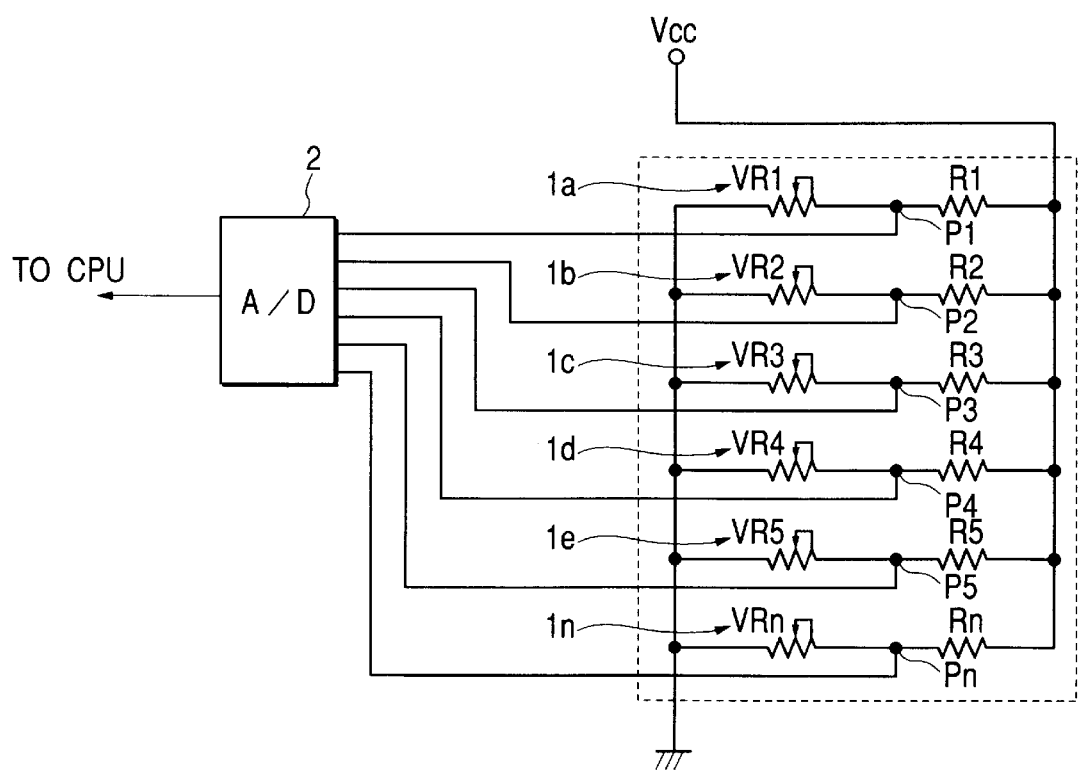
FIG. 6 is a circuit diagram of a conventional detector.
Figure 7:
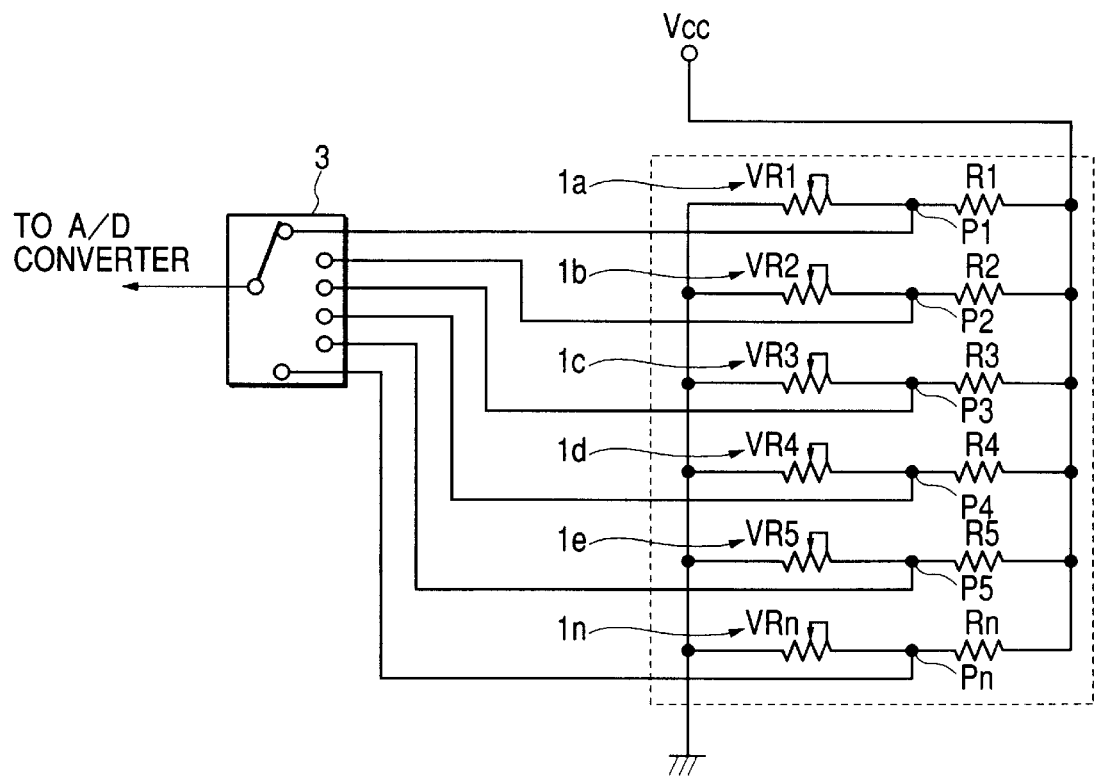
FIG. 7 is a circuit diagram of another conventional detector.

In the present invention, in the detectors shown in FIGS. 6 and 7, the elements may be switched in order to a low potential (ground potential) at the ground side thereof. In FIG. 7, switching to a low potential and switching by the switching means 3 may be synchronized so that output from an element through which a current flows when placed into a low potential is switched by the switching means 3 before being presented to the CPU. In FIGS. 6 and 7, switching in order to a low potential has the effect of reducing current consumption.

As has been described above, in the detector of the present invention, since the ends of plural input means are switched in order to a low potential, no undesired current flows through elements other than an element switched to the low potential. Consequently, current consumption can be reduced. Also, by providing output paths common to plural input means, input lines to an A/D converter and a control part can be decreased. Also, by sharing a fixed resistor, the number of parts can be reduced.

What is claimed is:

1. A detector provided with plural input means, each said input means having an element changing in resistance value and a fixed resistor directly connected in series with each other, a midpoint between the element and the fixed resistor being defined as an output part, wherein one of the plural input means is held at a predetermined potential, a switching means is provided for switching in order other ends of the input means to a low potential, and an output from the output part of the input means switched to the low potential by the switching means is detected, wherein there is provided a common output path connected in common to the output parts of the plural input means, and an output from an input means switched to a low potential in the other end thereof is detected through the common output path, wherein, in the plural input means provided with the common output path, a fixed resistor common to the individual elements of the input means is directly connected in series, the end of the fixed resistor is held at the predetermined potential, and the respective ends of the elements are switched to the low potential by the switching means, and wherein outputs from the input means are detected; a control part constituting the switching means is provided; and the control part switches in order the other ends of the input means to the low potential and switches the other ends thereof not placed into the low potential to high impedance.

2. The detector according to claim 1, wherein the elements changing in resistance value have a resistance member and a contact that has a lower resistivity than the resistance member and contacts the resistance member while deforming elastically, and resistance values of the resistance member change according to changes in a contact area between the resistance member and the contact.

* * * * *

UNITED STATES PATENT AND TRADEMARK OFFICE
CERTIFICATE OF CORRECTION

PATENT NO. : 6,573,730 B2
DATED : June 3, 2003
INVENTOR(S) : Koji Mita et al.

It is certified that error appears in the above-identified patent and that said Letters Patent is hereby corrected as shown below:

<u>Title page,</u>
Item [57], ABSTRACT,
Line 1, delete "having" and subtitute -- comprising -- in its place.

Signed and Sealed this

Twenty-fifth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,573,730 B2
DATED          : June 3, 2003
INVENTOR(S)    : Koji Mita et al.

It is certified that error appears in the above-identified patent and that said Letters Patent is hereby corrected as shown below:

<u>Title page,</u>
Item [65], Prior Publication Data, delete "US 2002/0030498" and substitute
-- US-2002-0032054-A1 -- in its place.

Signed and Sealed this

Eleventh Day of May, 2004

JON W. DUDAS
*Acting Director of the United States Patent and Trademark Office*